US011108888B2

(12) United States Patent
Kimmell et al.

(10) Patent No.: US 11,108,888 B2
(45) Date of Patent: Aug. 31, 2021

(54) DIGITAL RIGHTS LIST FOR DEVICE GROUPS

(71) Applicant: Microsoft Technology Licensing, LLC, Redmond, WA (US)

(72) Inventors: Chris Kimmell, Redmond, WA (US); Tianyu Fang, Issaquah, WA (US); Nisarg Patel, Redmond, WA (US); Derrick Wampler, Bothell, WA (US); Kenneth F. Lavering, Woodinville, WA (US); James McColl, Lake Stevens, WA (US); Devin Jenson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 57 days.

(21) Appl. No.: 16/273,072

(22) Filed: Feb. 11, 2019

(65) Prior Publication Data

US 2019/0312955 A1    Oct. 10, 2019

Related U.S. Application Data

(63) Continuation of application No. 15/139,302, filed on Apr. 26, 2016, now Pat. No. 10,218,817.

(Continued)

(51) Int. Cl.
*H04L 29/06* (2006.01)
*G06F 21/10* (2013.01)

(52) U.S. Cl.
CPC .............. *H04L 67/42* (2013.01); *G06F 21/10* (2013.01); *H04L 63/101* (2013.01);
(Continued)

(58) Field of Classification Search
CPC . H04L 67/42; H04L 63/101; H04L 2463/103; G06F 21/10; G06F 2221/0706; G06F 2221/2137
See application file for complete search history.

(56) References Cited

U.S. PATENT DOCUMENTS 7,089,594 B2 ‡   8/2006   Lal ..................... G06F 21/10
                                                           705/59
8,224,752 B2 ‡   7/2012   Read .................. G06F 21/10
                                                           705/59

(Continued)

FOREIGN PATENT DOCUMENTS

CN        1826584 A       8/2006
CN      101001148 A       7/2007
(Continued)

OTHER PUBLICATIONS

"International Preliminary Report on Patentability Issued in PCT Application No. PCT/US2016/029638", dated Mar. 31, 2017, 7 Pages.‡

(Continued)

*Primary Examiner* — Sarah Su
(74) *Attorney, Agent, or Firm* — Newport IP, LLC; Jacob P. Rohwer

(57) ABSTRACT

In one example, a device directory server may maintain a digital rights management list for a user device belonging to a device group associated with a user. The device directory server may maintain a primary digital rights management list associating a user device with a primary online account for a user having a content license for a digital content item. The device director server may receive a status update indicating the user device is still in use by the user if sent by the user device. The device directory server may determine whether a status update has been received from the user device. The device directory server may deactivate the user (Continued)

device on the primary digital rights management list when no status update has been received within a pruning period for the user device to be associated with the primary online account.

12 Claims, 17 Drawing Sheets

Related U.S. Application Data

(60) Provisional application No. 62/154,046, filed on Apr. 28, 2015.

(52) U.S. Cl.
CPC ............... *G06F 2221/0706* (2013.01); *G06F 2221/2137* (2013.01); *H04L 2463/103* (2013.01)

(56) References Cited

U.S. PATENT DOCUMENTS

| | | | | |
|---|---|---|---|---|
| 8,336,090 B2 ‡ | 12/2012 | Ache | ........................ | G06F 21/10 705/75 |
| 8,371,855 B1 * | 2/2013 | Gayles | .................... | G06F 21/10 434/51 |
| 8,560,455 B1 ‡ | 10/2013 | Raman | ............... | G06Q 20/1235 705/59 |
| 8,660,961 B2 ‡ | 2/2014 | Raley | ...................... | G06F 21/10 705/51 |
| 8,813,246 B2 ‡ | 8/2014 | Hierro | ..................... | G06F 21/10 713/16 |
| 8,832,851 B2 ‡ | 9/2014 | Li | ......................... | G06F 21/105 726/27 |
| 8,856,072 B2 * | 10/2014 | Hannsmann | ........ | H04L 63/0428 707/620 |
| 8,887,299 B2 ‡ | 11/2014 | Wang | ..................... | G06F 21/10 726/27 |
| 8,898,469 B2 * | 11/2014 | Chan | ...................... | G06F 21/10 713/169 |
| 9,172,984 B2 * | 10/2015 | Levicki | ............ | H04N 21/25875 |
| 9,264,480 B1 * | 2/2016 | Saylor | ................... | H04L 63/104 |
| 10,037,339 B1 * | 7/2018 | Kleinpeter | .......... | G06F 16/1744 |
| 10,089,611 B1 * | 10/2018 | Eisher | ................. | G06F 21/6209 |
| 2002/0032905 A1 ‡ | 3/2002 | Sherr | ...................... | G06F 21/10 725/38 |
| 2003/0115069 A1 * | 6/2003 | Pence | ................... | G06Q 30/02 705/51 |
| 2004/0024688 A1 * | 2/2004 | Bi | .......................... | G06Q 40/04 705/37 |
| 2004/0034786 A1 * | 2/2004 | Okamoto | ............... | G06Q 30/06 713/189 |
| 2006/0089917 A1 ‡ | 4/2006 | Strom | ..................... | G06F 21/10 705/59 |
| 2006/0259436 A1 * | 11/2006 | Hug | ......................... | G06F 21/10 705/59 |
| 2006/0272031 A1 * | 11/2006 | Ache | ..................... | G06F 21/10 726/28 |
| 2007/0094145 A1 * | 4/2007 | Ta | ......................... | G06Q 30/06 705/59 |
| 2008/0040283 A1 * | 2/2008 | Morris | .................... | G06F 21/10 705/59 |
| 2008/0040716 A1 * | 2/2008 | Lam | ....................... | G06F 9/455 718/1 |
| 2008/0065911 A1 * | 3/2008 | Elazar | .................... | G06Q 30/06 713/194 |
| 2008/0071688 A1 * | 3/2008 | Corbett | .................. | G06F 21/10 705/59 |
| 2008/0148363 A1 ‡ | 6/2008 | Gilder | .................... | G06F 21/10 726/4 |
| 2008/0320607 A1 * | 12/2008 | Richardson | ........... | G06F 21/105 726/33 |
| 2009/0119779 A1 * | 5/2009 | Dean | ..................... | G06F 21/105 726/26 |
| 2009/0138975 A1 * | 5/2009 | Richardson | ............. | G06F 21/73 726/32 |
| 2009/0151006 A1 ‡ | 6/2009 | Saeki | ...................... | G06F 21/10 726/28 |
| 2009/0222926 A1 * | 9/2009 | Pavan | ..................... | H04L 63/10 726/26 |
| 2010/0049989 A1 * | 2/2010 | Lee | ........................ | G06F 21/105 713/189 |
| 2010/0125511 A1 * | 5/2010 | Jouret | ..................... | G06F 21/10 705/26.1 |
| 2010/0268621 A1 * | 10/2010 | Takechi | ........... | H04N 21/47202 705/26.1 |
| 2011/0113122 A1 * | 5/2011 | Drope | .............. | H04N 21/41407 709/219 |
| 2011/0145896 A1 ‡ | 6/2011 | Berger | .................... | G06F 21/10 726/5 |
| 2011/0219229 A1 * | 9/2011 | Cholas | ..................... | H04L 9/32 713/168 |
| 2012/0005041 A1 * | 1/2012 | Mehta | ................. | G06Q 30/0601 705/27.1 |
| 2012/0059910 A1 * | 3/2012 | Cassidy | ................. | G06Q 30/00 709/219 |
| 2012/0216108 A1 * | 8/2012 | Yambal | .................. | G06Q 10/10 715/234 |
| 2012/0296823 A1 | 11/2012 | Pousti | | |
| 2013/0067599 A1 * | 3/2013 | Raje | ........................ | G06F 21/60 726/29 |
| 2014/0033277 A1 | 1/2014 | Xiao et al. | | |
| 2014/0164760 A1 * | 6/2014 | Hybertson | ..... | H04N 21/440218 713/153 |
| 2014/0172595 A1 ‡ | 6/2014 | Beddow et al. | ... | G06Q 20/1235 705/16 |
| 2014/0215214 A1 * | 7/2014 | Barnes | .................... | G06F 21/10 713/171 |
| 2014/0330945 A1 | 11/2014 | Dabbiere et al. | | |
| 2015/0121487 A1 * | 4/2015 | Chastain | ............... | H04W 12/06 726/6 |
| 2015/0154386 A1 * | 6/2015 | Clement | ............ | H04N 21/4627 726/29 |
| 2015/0332225 A1 * | 11/2015 | Schulz | .................... | H04L 65/60 705/26.81 |
| 2016/0171189 A1 * | 6/2016 | Drope | ............. | H04N 21/25816 713/168 |
| 2017/0011768 A1 * | 1/2017 | Cho | ................... | G11B 20/0021 |
| 2017/0063948 A1 * | 3/2017 | Shroff | .................. | H04L 63/102 |
| 2018/0132046 A1 ‡ | 5/2018 | Westermann | ........ | H04R 25/558 |
| 2018/0288466 A1 * | 10/2018 | Monnerat | ........ | H04N 21/41265 |
| 2019/0166223 A1 * | 5/2019 | Zhu | ..................... | H04L 67/2842 |
| 2019/0268643 A1 * | 8/2019 | Raley | ................ | H04N 21/2541 |

FOREIGN PATENT DOCUMENTS

| | | |
|---|---|---|
| CN | 101340278 A | 1/2009 |
| CN | 101447008 A | 6/2009 |
| CN | 101558411 A | 10/2009 |
| CN | 101854245 A | 10/2010 |
| CN | 102282593 A | 12/2011 |
| CN | 103039039 A | 4/2013 |
| CN | 103188261 A | 7/2013 |
| RU | 2013147288 A ‡ | 4/2015 |

OTHER PUBLICATIONS

"International Search Report and Written Opinion Issued in PCT Application No. PCT/US2016/029638", dated Jul. 12, 2016, 11 Pages.‡

Arnab, Alapan, "Digital Rights Management—A Current Review", In Proceedings of Infosec South Africa 2004 Conference, Apr. 2004, 25 pages.‡

"Office Action Issued in European Patent Application No. 16721591.2", dated Aug. 9, 2018, 4 Pages.‡

"Office Action Issued in European Patent Application No. 16721591.2", dated Jan. 4, 2019, 4 Pages.

(56) References Cited

OTHER PUBLICATIONS

"First Office Action and Search Report Issued in Chinese Patent Application No. 201680024916.8", dated Jan. 19, 2020, 12 Pages.
"Notice of Allowance and Search Report Issued in Chinese Patent Application No. 201680024916.8", dated Nov. 5, 2020, 8 Pages.
"Office Action Issued in Indian Patent Application No. 201747033229", dated Feb. 19, 2021, 6 Pages.

\* cited by examiner
‡ imported from a related application

| CONTENT ITEM 310 | DEVICE ID 320 | DEVICE TYPE 330 | LICENSE PERIOD 340 | PRUNING PERIOD 350 | SECONDARY ACCOUNT 360 |
|---|---|---|---|---|---|
| | DEVICE ID 320 | DEVICE TYPE 330 | LICENSE PERIOD 340 | PRUNING PERIOD 350 | SECONDARY ACCOUNT 360 |
| | DEVICE ID 320 | DEVICE TYPE 330 | LICENSE PERIOD 340 | PRUNING PERIOD 350 | SECONDARY ACCOUNT 360 |
| | DEVICE ID 320 | DEVICE TYPE 330 | LICENSE PERIOD 340 | PRUNING PERIOD 350 | SECONDARY ACCOUNT 360 |
| | DEVICE ID 320 | DEVICE TYPE 330 | LICENSE PERIOD 340 | PRUNING PERIOD 350 | SECONDARY ACCOUNT 360 |

300
Figure 3

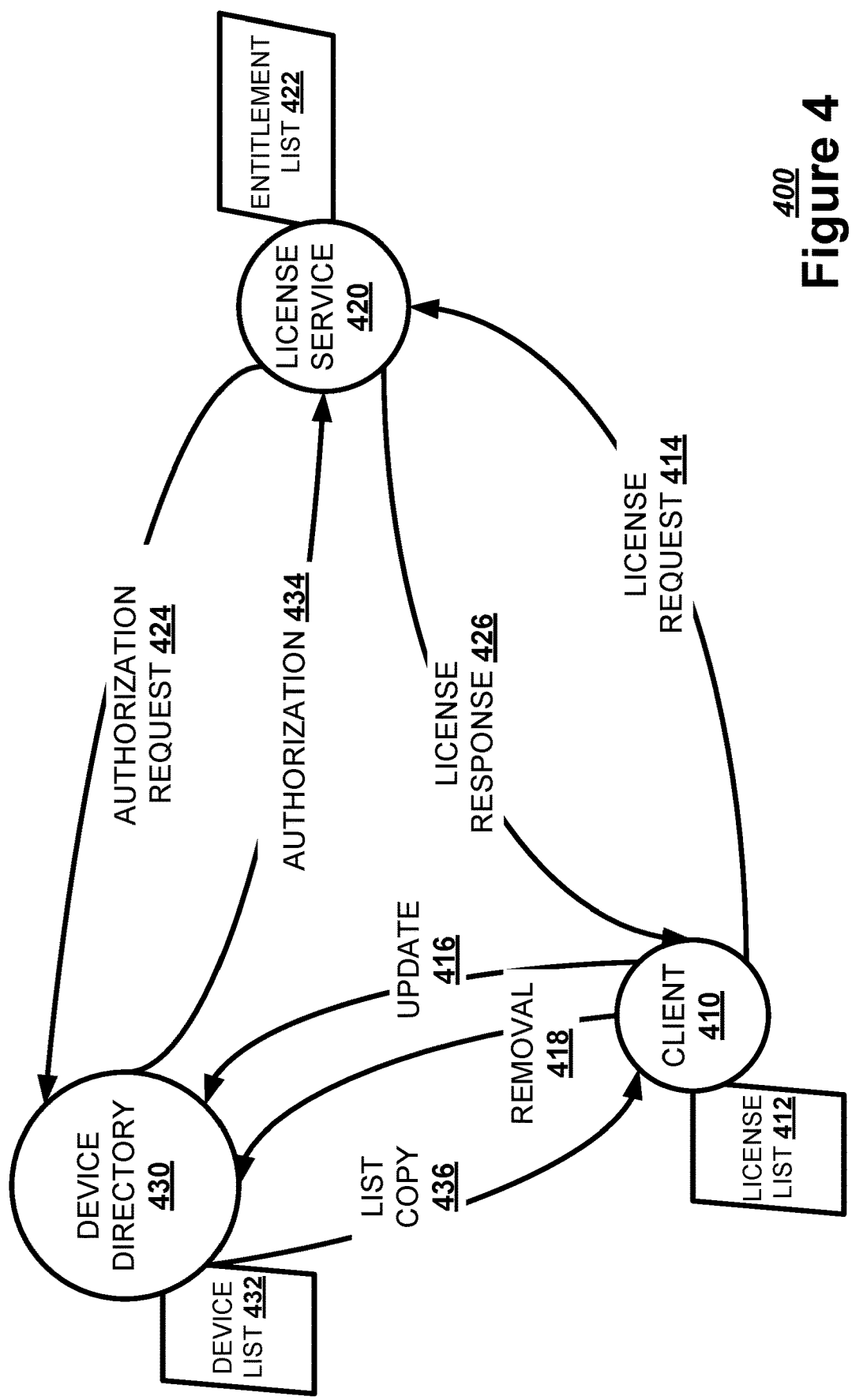

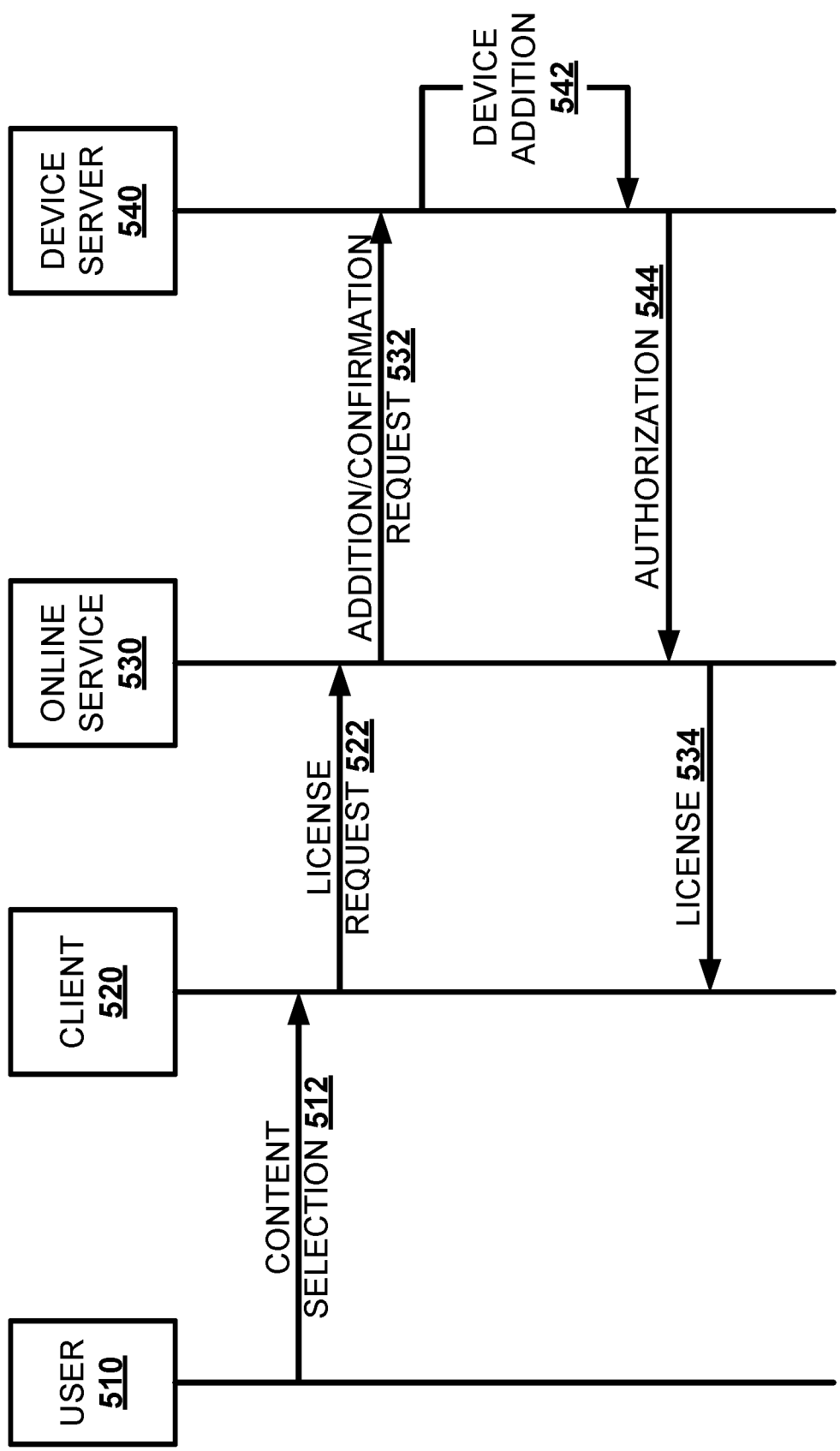

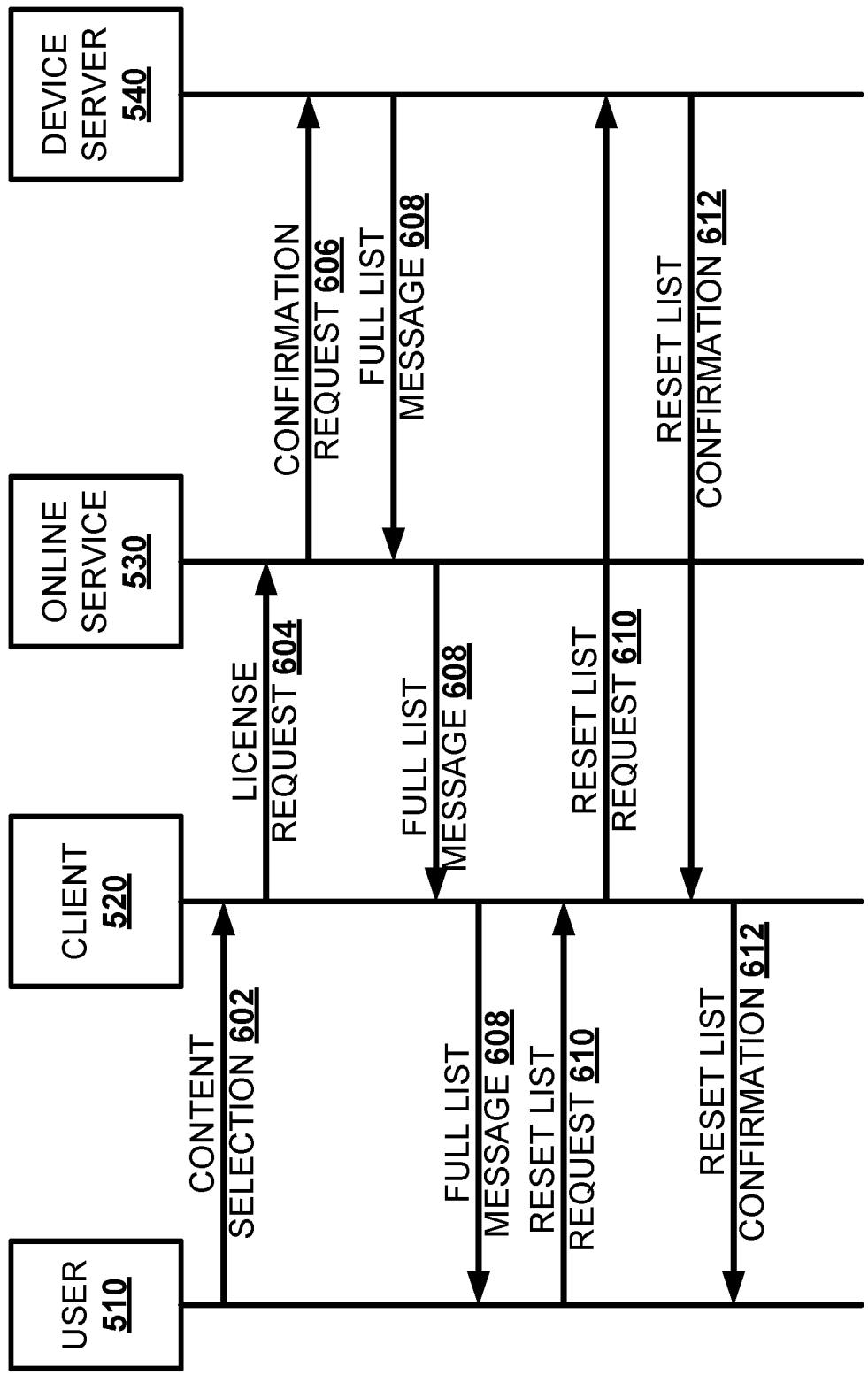

*1400*

DIGITAL RIGHTS LIST FOR DEVICE GROUPS

PRIORITY INFORMATION

This application is a continuation and claims priority to U.S. application Ser. No. 15/139,302, filed Apr. 26, 2016 which claims priority to U.S. Provisional Patent Application Ser. No. 62/154,046, filed Apr. 28, 2015, the contents of which are incorporated herein by reference in their entirety.

BACKGROUND

A user device may download a digital content item for presentation to a user. A digital content item may be a text file, a digital image, an audio file, a video file, a game, a software application, or other digital item. Each of these digital content items may have a content license that governs the terms under which the user may use the digital content item. An online service may maintain a digital rights management list that tracks the content license for each digital content item acquired by the user.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to maintaining a digital rights management list for a user device belonging to a device group associated with a user. The device directory server may maintain a primary digital rights management list associating a user device with a primary online account for a user having a content license for a digital content item. The device director server may receive a status update indicating the user device is still in use by the user when sent by the user device. The device directory server may determine whether a status update has been received from the user device. The device directory server may deactivate the user device on the primary digital rights management list when no status update has been received within a pruning period for the user device to be associated with the primary online account.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 3 illustrates, in a block diagram, one example of digital rights management list entry.

FIG. 4 illustrates, in a block diagram, one example of a licensing request interaction.

FIG. 5 illustrates, in a flow diagram, one example of a license acquisition.

FIG. 6 illustrates, in a flow diagram, one example of a device list overload.

DETAILED DESCRIPTION

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a device directory server, a tangible machine-readable medium having a set of instructions detailing a method stored thereon for at least one processor, or a machine-implemented method.

In one example, a device directory server may maintain a digital rights management list for a user device belonging to a device group associated with a user. The device directory server may maintain a primary digital rights management list associating a user device with a primary online account for a user having a content license for a digital content item. The device director server may receive a status update indicating the user device is still in use by the user when sent by the user device. The device directory server may determine whether a status update has been received from the user device. The device directory server may deactivate the user device on the primary digital rights management list when no status update has been received within a pruning period for the user device to be associated with the primary online account.

A device directory server may store a digital rights management list linking a group of devices to a user account associated with a user. The user may have one or more content licenses for one or more digital content items, such that an unlimited number of licenses may be granted to the authorized devices registered in the user's device group. A device directory server may maintain a list of up to a set number of devices, such as ten devices. The device directory server may track a user device using a global hardware identifier. The device directory server may add a user device to a device group the first time a user downloads a digital content item to the user device and acquires a content license for the digital content item. The user may manually remove a user device from a device group. The device directory server may limit the number of user devices the user may remove in a given period to prevent refresh logic from starting and re-adding the device. The user may view the entire device group for each client type. The device directory server may remove a user device if the user device does not verify membership within a pruning period during which the user device is associated with an online account. A device may belong to multiple device groups when a digital content item has been downloaded using a different online account.

Figure 1:
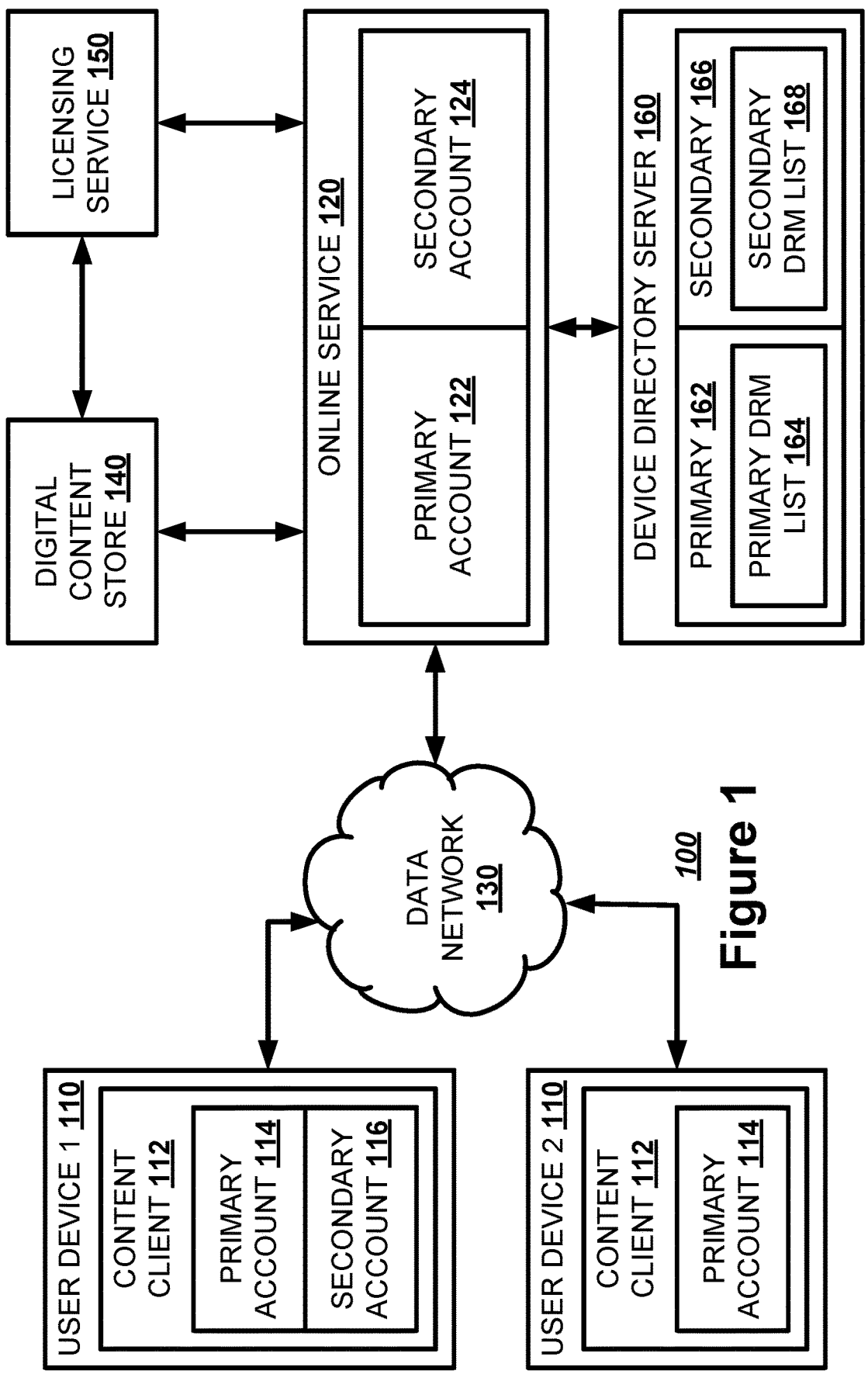
FIG. 1 illustrates, in a block diagram, one example of a computing network.

FIG. 1 illustrates, in a block diagram, one example of a computing network 100. A user device 110 may executes a content client application 112 to present a digital content item to a user. The digital content item may be a text file, a digital image, an audio file, a video file, a game, a software application, or other digital items. The user device 110 may use the content client application 112 to access an online service 120 via a data network connection 130. The online service 120 may be any network service that provides content or a service to a user via an online user account, such as an email service, a system-as-a-service (SaaS) operating system, a media service, or a digital library. The online service 120 may be implemented on a single server or a distributed set of servers, such as a server farm. The data network connection 130 may be an internet connection, a wide area network connection, a local area network connection, or other type of data network connections.

A first user may login to the content client application 112 via a primary online account 114 that connects to a primary online account 122 resident in the online service 120. The user may use the primary online account 114 to have the same user experience on multiple user devices 110, such as a desktop, a laptop, a tablet, or a smartphone. Additionally, certain user devices 110 may be used by multiple users, such as a game console used by different family members. A second user may login to the content client application 112 via a secondary online account 116 that connects to a secondary online account 124 resident in the online service 120.

A user may use the online service 120 to access one or more digital content items. Each digital content item may have a licensing agreement that governs how the user may view and consume the digital content item. The online service 120 may connect the user to a digital content store 140 to download the digital content item to the user device 110. Alternately, the user may transfer the digital content item to the user device by connecting the user device to a data storage device, such as a universal serial bus (USB) solid state drive. The online service 120 may contact a licensing service 150 to retrieve a licensing agreement for the digital content item upon first access to the digital content item by the content client application 112. The licensing agreement may specify how many user devices 110 on which the user may store the digital content item. The online service 120 may combine the functions of the digital content store 140 and the licensing service 150, or each service may act separately.

The online service 120 may store data describing the licensing agreement for the user device on a device directory server 160. The device directory server 160 may associate a primary online account 162 with a primary digital rights management (DRM) list 164. The primary digital rights management list 164 may describe a digital content item and the user devices 110 on which a first user may view or operate the digital content item. Similarly, the device directory server 160 may associate a secondary online account 166 with a secondary digital rights management list 168. The secondary digital rights management list 168 may describe a digital content item and the user devices 110 on which a second user may view or operate the digital content item. A second user may view or operate a digital content item licensed to a first user on a shared user device 110 without being licensed for the digital content item. Alternately, the first user may have to be signed in to the primary online account 114 for the second user to view or operate the digital content item.

Figure 2:
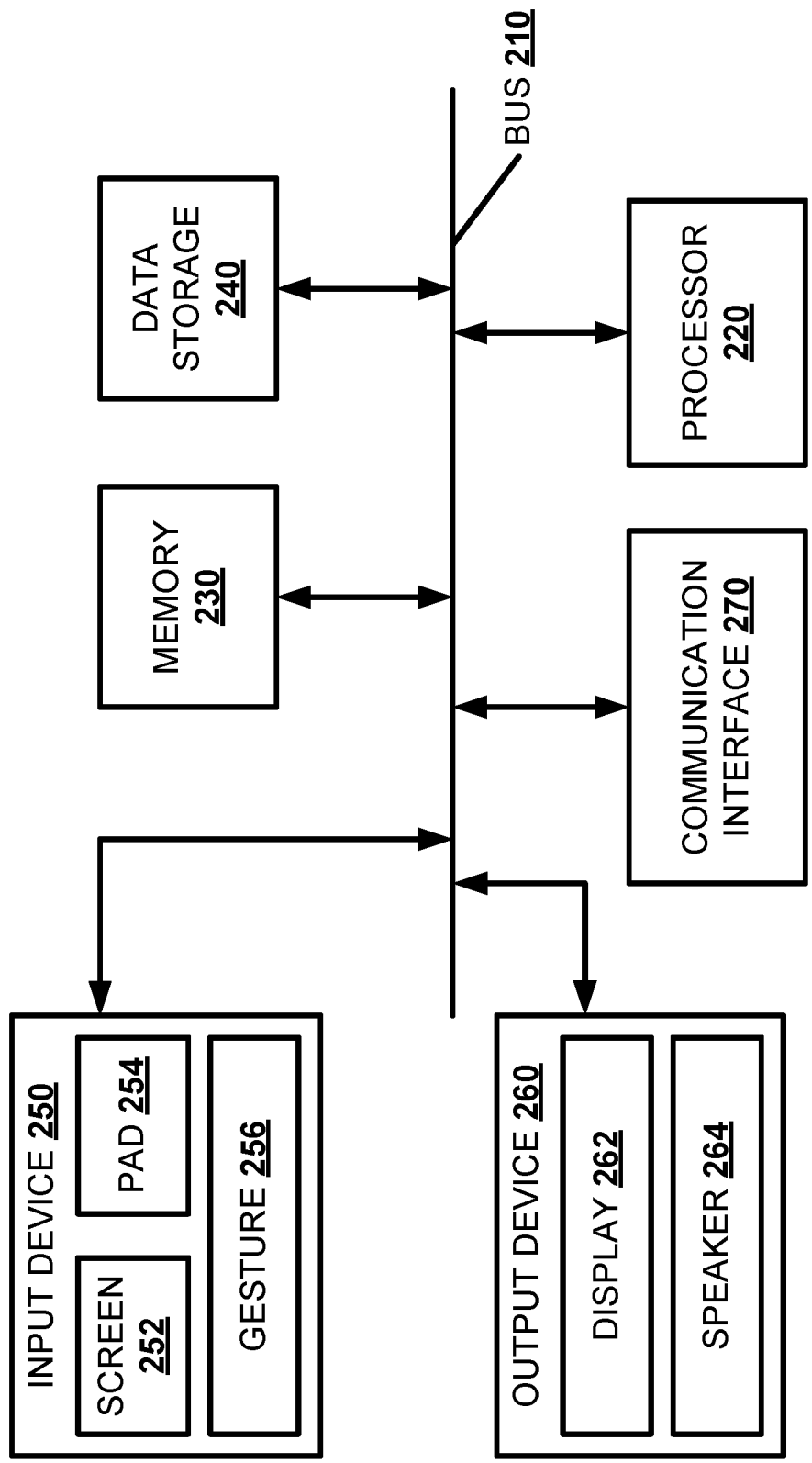
FIG. 2 illustrates, in a block diagram, one example of a computing device.

FIG. 2 illustrates a block diagram of an exemplary computing device 200 which may act as a user device, an online service server, a device directory server, a licensing server, and a digital content store. The computing device 200 may combine one or more of hardware, software, firmware, and system-on-a-chip technology to implement a user device, an online service server, a device directory server, a licensing server, and a digital content store. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The at least one processor may be configured to determine whether the status update has been received from the user device. The at least one processor may be configured to deactivate the user device on the primary digital rights management list when no status update has been received within a pruning period for the user device to be associated with the primary online account. The at least one processor may be further configured to remove the user device from the primary digital rights management list upon deactivating. The at least one processor may be also configured to cycle through a content list describing a digital content set for the user device upon receiving the status update to renew each content license for each digital content item on the content list. The at least one processor may be further configured to reset the pruning period for the user device upon receiving the status update via either a primary online account or a secondary online account for a second user associated with the user device. The pruning period may be longer than the licensing period.

The memory 230 may be a random access memory (RAM) or another type of dynamic data storage that stores information and instructions for execution by the processing core 220. The memory 230 may be configured to store a series of instructions that are executed by at least one processor to implement a content client application. The memory 230 may also store temporary variables or other intermediate information used during execution of instructions by the processing core 220. The memory 230 may be configured to maintain a primary digital rights management list associating a user device with a primary online account for a user having a content license for a digital content item. The memory 230 may be further configured to associate the user device with a secondary online account for a second user.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing digital content or a digital rights management list.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. For a user device, the input device 250 may be configured to receive a content selection from the user selecting a digital content item for viewing. The input device 250 may be further configured to receive login data for an online account.

The output device 260 may include one or more conventional mechanisms that output information to the user, including a display screen 262, a printer, one or more speakers 264, a headset, a vibrator, or a medium, such as a memory, or a magnetic or optical disk and a corresponding disk drive. For a user device, the output device 260 may be configured to present a selected digital content item to the user. The output device 260 may be further configured to present a login prompt to the user.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to connect to an online service. The communication interface may be further configured to connect to a device directory server or a license service, possibly via the online account.

The communication interface 270 may be configured to receive a status update indicating the user device is still in use by the user when sent by the user device. The communication interface 270 may be further configured to renew a content license for the user device for a licensing period for a data content item upon receiving the status update. The communication interface 270 may be also configured to receive the status update upon identification of an update trigger describing an event causing transmission of the status update by the user device. The update trigger may be at least one of a status period expiration, a user access of a content client application of the user device, and a client access of a content item by the content client application.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

A device directory server may maintain a digital rights management list detailing digital content items available to a user via a primary online account. FIG. 3 illustrates, in a block diagram, one example of digital rights management list entry 300. The digital rights management list entry 300 may have a digital content item field 310 describing the digital content item subject to the conditions of the licensing agreement. The digital rights management list entry 300 may have one or more device identifiers (ID) 320 identifying a device that may play, present, or execute the digital content item. Each digital rights management list entry 300 may have a limited number of slots representing a limited number of devices that may play, present, or execute the digital content item. Each device identifier 320 may have an associated device type 330 describing the device, such as a smartphone, a tablet, a laptop, a desktop, or a game console. Under some licensing agreements, a digital content item may have limited slots for specific device types. The device identifier 320 may be associated with a licensing period 340 describing a user-specific length of time that the user may view, play, or operated the digital content item on that user device. The device identifier 320 may be associated with a pruning period 350 describing a device-specific length of time that the user device may be associated with a digital content item before the user device is deactivated or even removed. The device identifier 320 may be associated with one or more secondary online accounts 360 also associated with the user device with access to the digital content item in addition to the primary online account.

FIG. 4 illustrates, in a block diagram, one example of a licensing request interaction 400. A content client application 410 may have a license list 412 describing the digital content items that the user device executing the content client application 410 is authorized to present or execute. The content client application 410 may send a license request 414 to a licensing service 420. The license request 414 may have a device identifier identifying the user device, a device type describing the user device, a user identifier, and login data for the licensing service 420.

The licensing service 420 may have an entitlements list 422 describing the digital content items that the user associated with an online account is authorized to view, play, or operate. The licensing service 420 may send an authorization request 424 to a device directory server 430. The authorization request 424 may have a user identifier, a device identifier identifying the user device, and a device type describing the user device.

The device directory server 430 may have a device list 432 describing each user device associated with the user authorized to present or execute a digital content item. The device directory server 430 may send an authorization confirmation 434 to the licensing service 420. The licensing service 420 may send a license response 426 providing a license for the digital content item to be executed or presented by the client content application 410 or alerting the client content application 410 that user device did not have a licensing agreement.

The device directory server 430 may send a copy of the device list 436 to the client content application 410. The client content application 410 may send a device update 416 to the device directory server 430 to add the user device to the device list 432. The device update 436 may have a user identifier, a device identifier identifying the user device, and a device type describing the user device. If the device list 432 indicates the user has already used each provided user device slot for the digital content item, the client content application 410 may send a device removal 418 to a device directory server 430 to remove a user device from the device list 432 to free up a slot for the user device executing the client content application 410.

FIG. 5 illustrates, in a flow diagram, one example of a license acquisition 500. A user 510 may input a content selection 512 of a digital content item using a content client application 520. The client content application 520 may send a license request 522 for the digital content item from the online service 530, which may act as the licensing service or may act as a gateway to the licensing service. The online service 530 may send a confirmation request 532 to the device directory server 540 to confirm that the user device executing the client content application 520 is authorized to present or execute the digital content item. Alternately, the confirmation request 532 may request that the device directory server add the user device to the list of devices authorized to present or execute the digital content item. The device directory server 540 may execute a device addition 542 adding the user device to the list of devices authorized to present or execute the digital content item. The device directory server 540 may send an authorization 544 to the online service 530 confirming that the user device executing the client content application 520 is authorized to present or execute the digital content item. The online service 530 may provide a license 534 for the digital content item to the client content application 520.

FIG. 6 illustrates, in a flow diagram, one example of a device list overload 600. A user 510 may input a content selection 602 of a digital content item using a content client application 520. The client content application 520 may send a license request 604 for the digital content item from the online service 530, which may act as the licensing service or may act as a gateway to the licensing service. The online service 530 may send a confirmation request 606 to the device directory server 540 to confirm that the user device executing the client content application 520 is authorized to present or execute the digital content item. Alternately, the confirmation request 606 may request that the device directory server add the user device to the list of devices authorized to present or execute the digital content item. The device directory server 540 may respond with a full list message 608 to the online service 530 indicating that the user 510 has used the available slots for the user device. The online service 530 may forward the full list message 608 to the content client application 520 indicating that the user 510 has used the available slots for the user device. The content client application 520 may present the full list message 608 to the user 510 indicating that the user 510 has used the available slots for the user device.

The user 510 may send a list reset request 610 the content client application 520 to reset the device list. The content client application 520 may forward the list reset request 610 to the device directory server 540 to clear the device list. The device directory server 540 may check to see if a time limit preventing the removal of devices is being enforced. If no time limit prevents the removal of devices, the device directory server 540 may clear the device list. After the device directory server 540 has cleared the device list for the digital content item, the device directory server 540 may send a list reset confirmation 612 to the content client application 520 indicating either that the device list has been cleared or, if a time limit prevents removal of the devices, denying the list reset request 610. The client content application 520 may present the list reset confirmation 612 to inform the user 510 whether the device list has been cleared or whether the request was denied.

Figure 7:
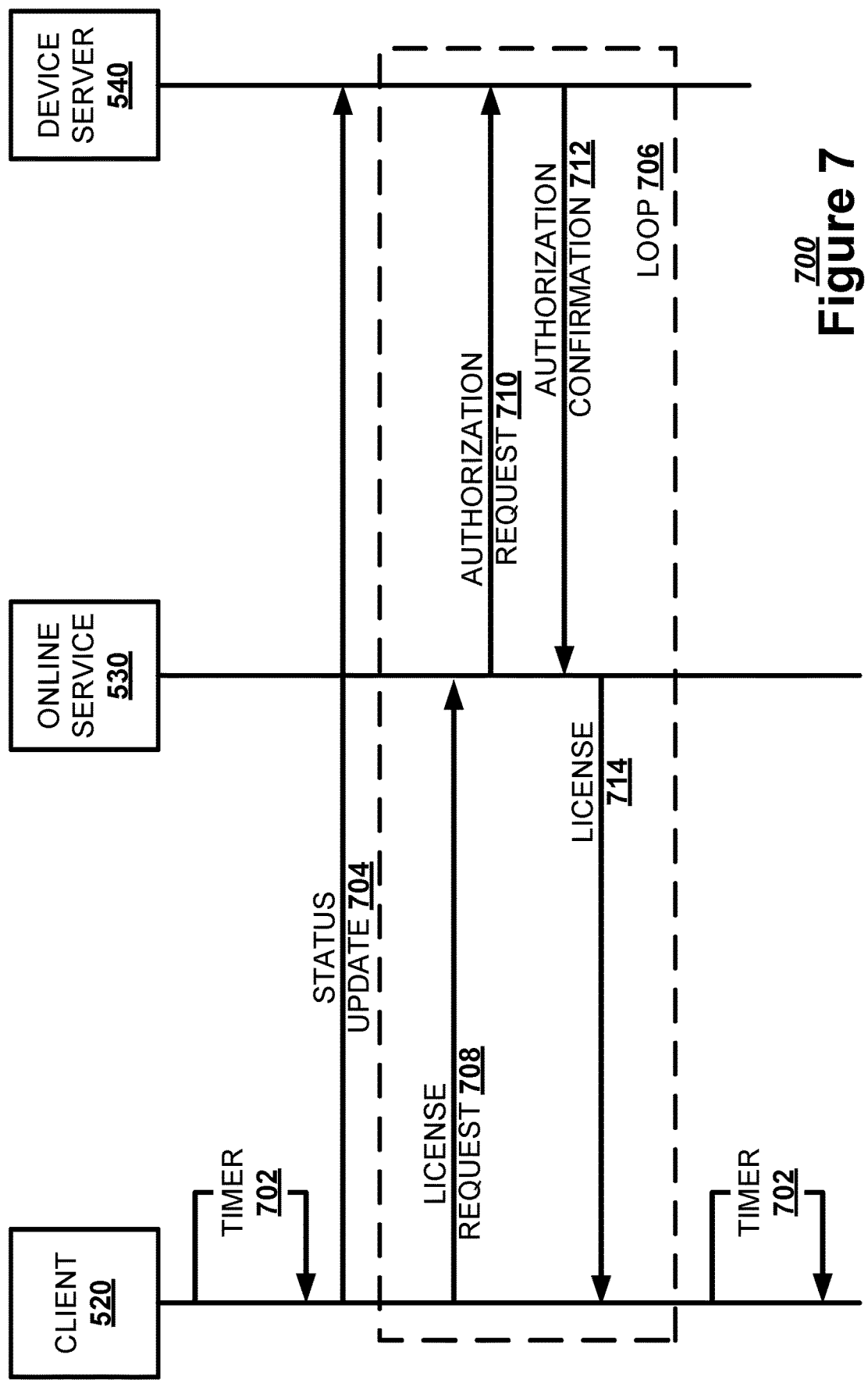
FIG. 7 illustrates, in a flow diagram, one example of a license update.

FIG. 7 illustrates, in a flow diagram, one example of a license update 700. The content client application 520 may execute a synchronization timer 702 that determines whether a status period has passed. A status period describes the length of time that a user device may wait before sending a status update to more efficiently use device and network resources. The length of the status period, licensing period, and pruning period may be based on historical user patterns. The content client application 520 may send a status update 704 to the device directory server 540 indicating that the user device executing the content client application 520 is still in use by the user. The content client application 520 may initiate a loop 706 to cycle through a content list for a user device to renew the licenses for the digital content items in the content list. In the loop 706, the content client application 520 may send a license request 708 for a digital content item of the content list identifying the user device to an online service 530. The online service may send an authorization request 710 identifying the user device to the device directory server 540. The device directory server 540 may send an authorization confirmation 712 to the online service 530 confirming that the user device is authorized to present or execute the digital content item. The online service 530 may send a license 714 for the digital content item to the content client application 520. Once the content client application 520 has cycled through the content list, the content client application 520 again may execute a synchronization timer 702 that determines whether a status period has passed.

Figure 8:
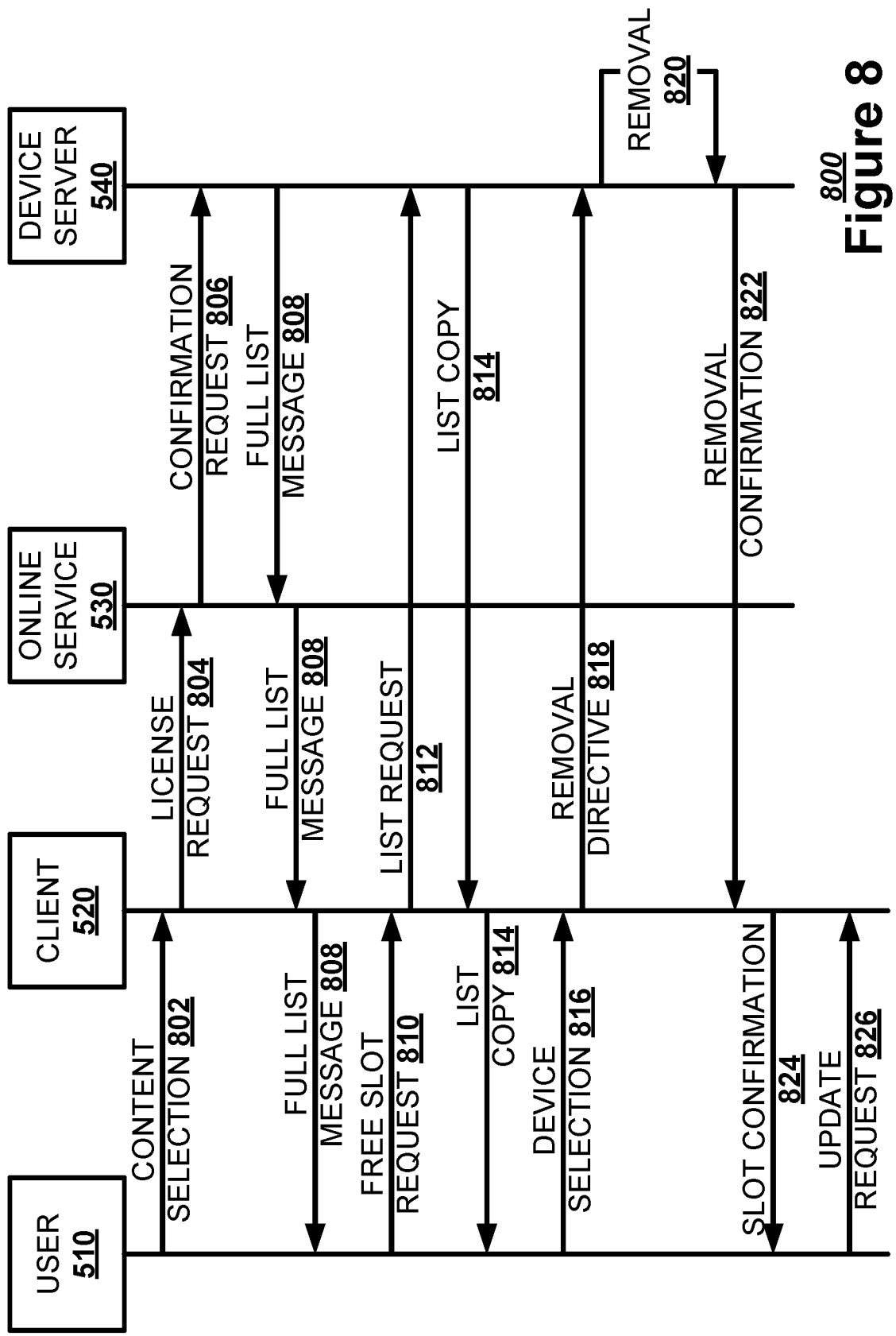
FIG. 8 illustrates, in a flow diagram, one example of a device replacement.

FIG. 8 illustrates, in a flow diagram, one example of a device replacement 800. A user 510 may input a content selection 802 of a digital content item using a content client application 520. The client content application 520 may send a license request 804 for the digital content item from the online service 530, which may act as the licensing service or may act as a gateway to the licensing service. The online service 530 may send a confirmation request 806 to the device directory server 540 to confirm that the user device executing the client content application 520 is authorized to present or execute the digital content item. Alternately, the confirmation request 806 may request that the device directory server add the user device to the list of devices authorized to present or execute the digital content item. The device directory server 540 may respond with a full list message 808 to the online service 530 indicating that the user 510 has used the available slots for the user device. The online service 530 may forward the full list message 808 to the content client application 520 indicating that the user 510 has used the available slots for the user device. The content client application 520 may present the full list message 808 to the user 510 indicating that the user 510 has used the available slots for the user device.

The user 510 may input a free slot request 810 into the content client application 520 asking that a slot be made available for the current user device. The content client application may send a device list request 812 to the device directory server 540 requesting the user devices currently authorized for the digital content item. The device directory server 540 may provide a device list copy 814 to the content client application 520. The content client application 520 may present the device list copy 814 to the user 510.

The user 510 may input a device selection 816 into the content client application 520 indicating which user device to remove from the device list on the device directory server 540. The client content application 520 may send a removal directive 818 to the device directory server 540 to remove the selected user device from the device list. The device directory server 540 may check to see if a time limit preventing the removal of devices is being enforced. If no time limit prevents the removal of devices, the device directory server 540 may execute a removal 820 of the selected user device from the device list. The device directory server 540 may send a removal confirmation 822 to the content client application 520 either confirming removal of the selected user device or, if a time limit prevents removal of the devices, denying the removal directive 818. The content client application 520 may present a slot confirmation 824 to the user 510 confirming that a slot is now available on the device list or indicating that the device removal was denied. If the slot is now available, the user 510 may input an update request 826 into the content client application 520 requesting that the current user device be added to the device list.

Figure 9:
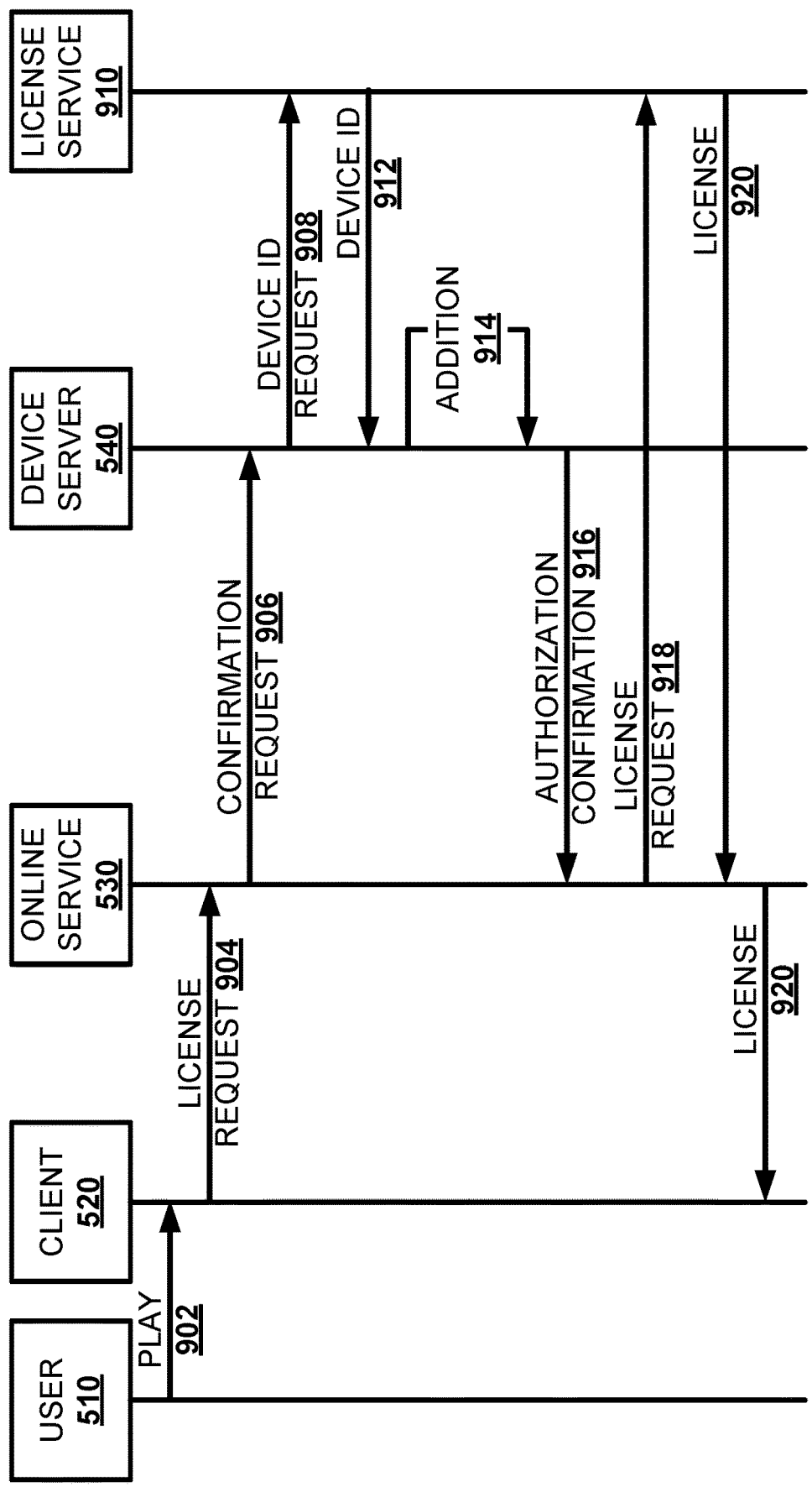
FIG. 9 illustrates, in a flow diagram, one example of a license renewal.

FIG. 9 illustrates, in a flow diagram, one example of a license renewal 900. A user 510 may direct a content client application 520 to play 902 a digital content item. The content client application 520 may send a license request 904 to an online service 530 requesting a license for the digital content item. The online service 530 may send a confirmation request 906 to the device directory server 540 to confirm that the user device executing the client content application 520 is authorized to present or execute the digital content item. The device directory server 540 may send a device identifier request 908 to a licensing service 910 to determine the device identifier for the user device. The licensing service 910 may provide a device identifier 912 for the user device to the device directory server 540. The device directory server 540 may execute an addition 914 of the device identifier 912 to the device list. The device directory server 540 may send an authorization confirmation 916 to the online service 530. The online service 530 may send a license request 918 for the digital content item to the licensing service 910. The licensing service 910 may send a license 920 for the digital content item to the online service 530. The online service 530 may forward the license 920 to the content client application 520.

Figure 10:
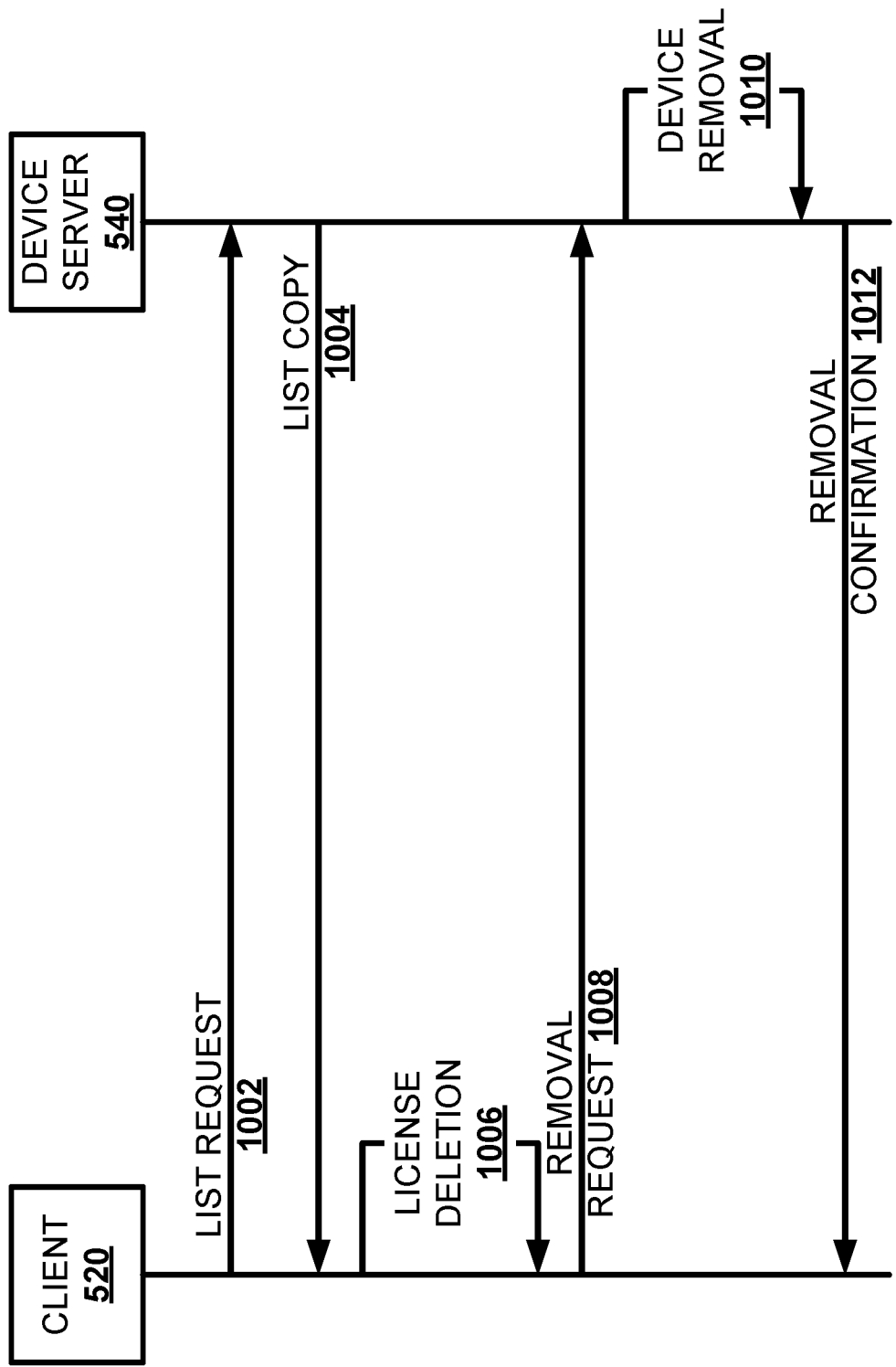
FIG. 10 illustrates, in a flow diagram, one example of a device deactivation.

FIG. 10 illustrates, in a flow diagram, one example of a device deactivation 1000. The content client application 520 may send a list request 1002 to the device directory server 540 for a device list describing the digital content items associated with the user device. The device directory server 540 may send a list copy 1004 of the device list to the content client application 520. The content client application 520 may execute a license deletion 1006 removing the licenses for the digital content items from the user device. The content client application 520 may send a removal request 1008 to the device directory server 540 to remove the user device from the device list. The device directory server 540 may execute a device removal 1010 to remove the user device from the device list. The device directory server 540 may send a removal confirmation 1012 to the content client application 520 confirming removal of the user device from the device list.

Figure 11:
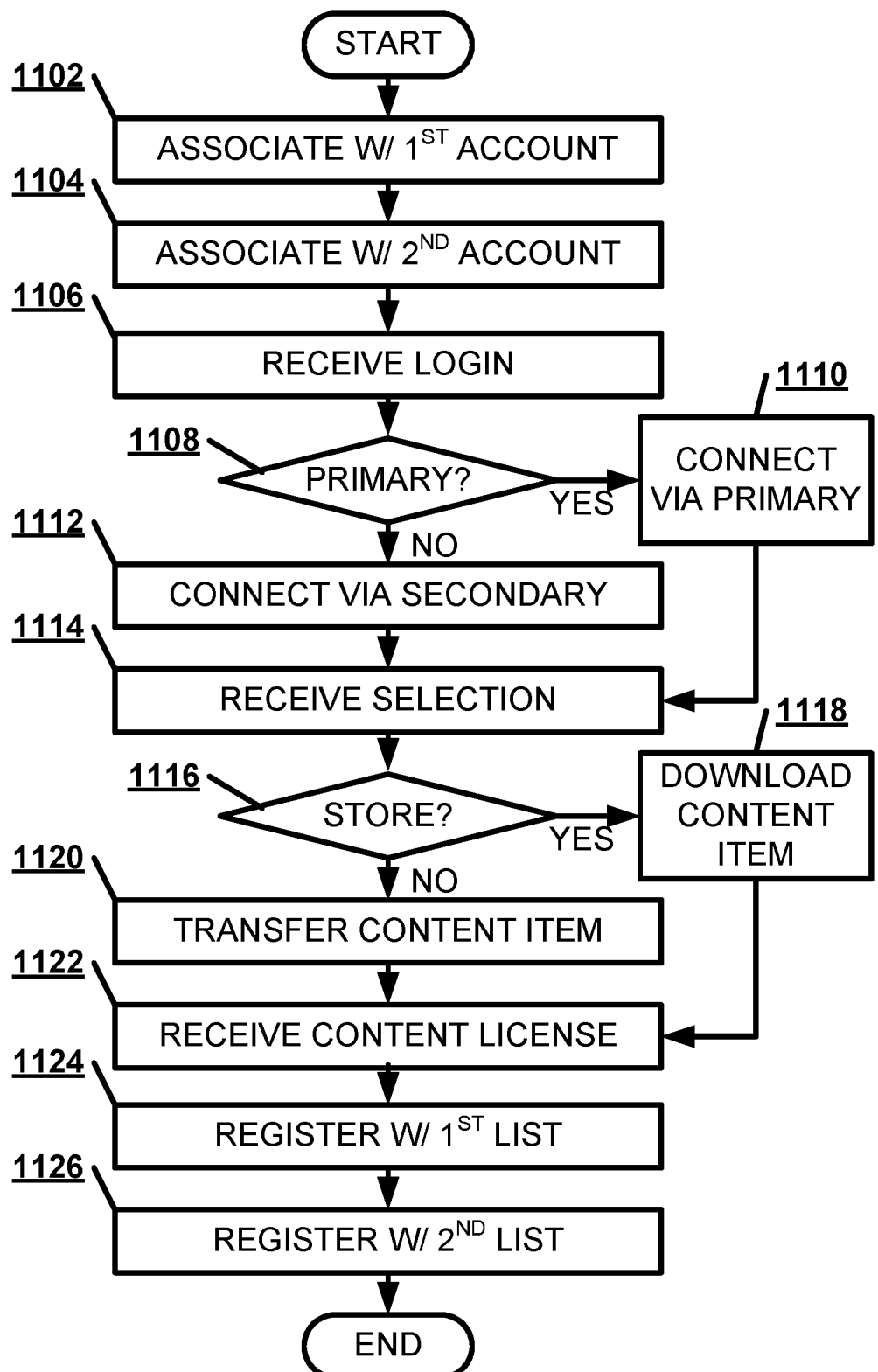
FIG. 11 illustrates, in a flowchart, one example of a method of registering digital content with a user device.

FIG. 11 illustrates, in a flowchart, one example of a method 1100 of registering digital content with a computing device, such as a user device. The user device may associate with a primary online account for a user of an online service (Block 1102). The user device may associate with a secondary online account for a second user of the online service (Block 1104). The user device may receive login data from a user (Block 1106). If the login data is for the primary online account (Block 1108), the user device may connect with the online service via the primary online account (Block 1110). If the login data is for the secondary online account (Block 1108), the user device may connect with the online service via the secondary online account (Block 1112). The user device may receive a digital content item selection from the user (Block 1114). If the user selected a digital content item from a digital content store (Block 1116), the user device may download the digital content item from the digital content store (Block 1118). Otherwise, the user device may transfer the digital content item from a data storage device, either via a direct connection or a wireless connection (Block 1120). The user device may receive a content license for the digital content item from the licensing service via the online service (Block 1122). The user device may register a content license for the digital content item with a digital rights management list associating the user device with the primary online account at the online service (Block 1124). The user device may register the content license for the digital content item with a secondary digital rights management list associating the user device with the secondary online account at the online service (Block 1126).

Figure 12:
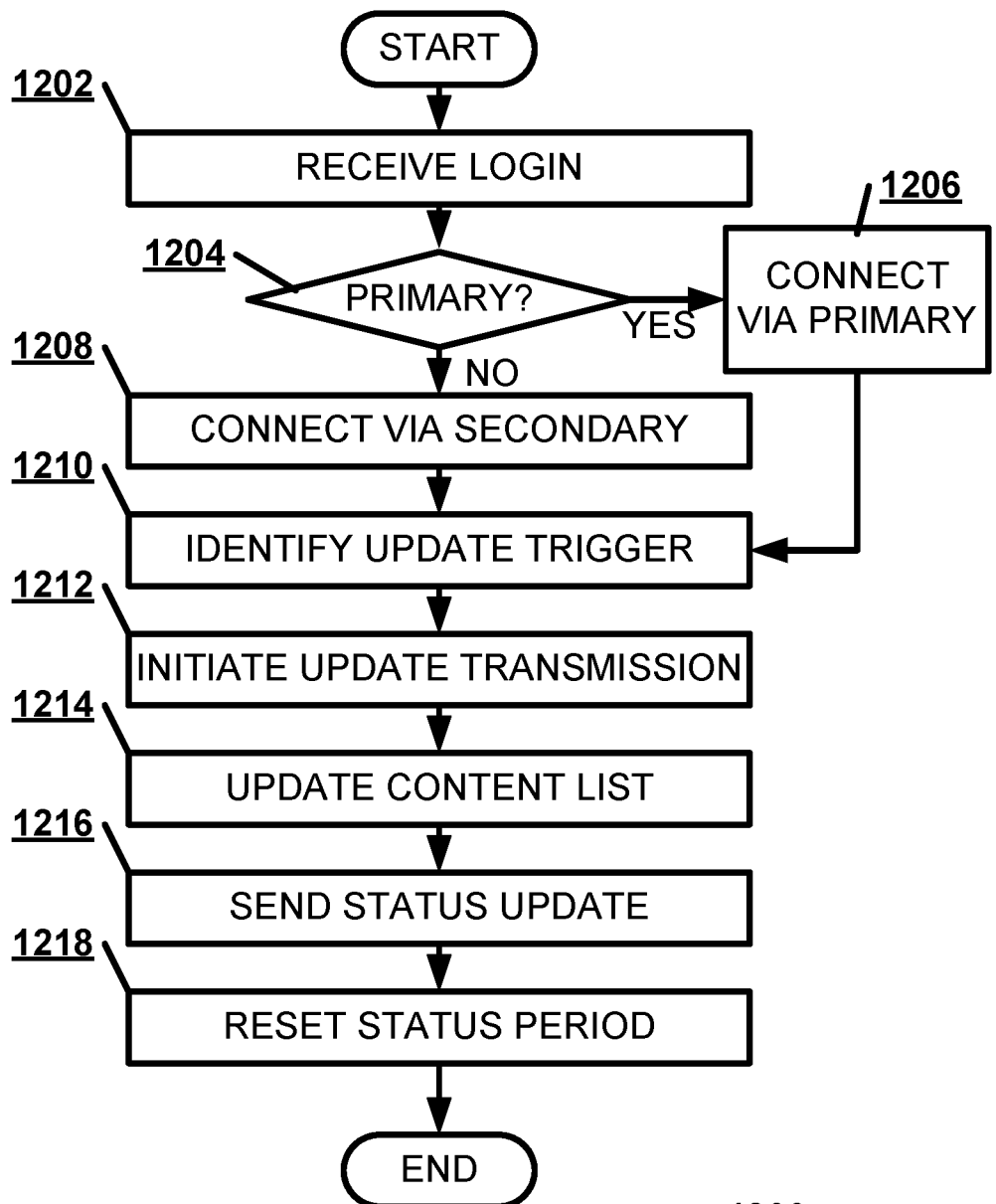
FIG. 12 illustrates, in a flowchart, one example of a method of sending a status update with a user device.

FIG. 12 illustrates, in a flowchart, one example of a method 1200 of sending a status update with a user device. The user device may receive login data from a user (Block 1202). If the login data is for a primary online account associated with a first user associated with the user device (Block 1204), the user device may connect with the online service via the primary online account to send a status update (Block 1206). If the login data is for a secondary online account associated with a second user associated with the user device (Block 1204), the user device may connect with the online service via the secondary online account to send a status update (Block 1208). The user device may identify at least one of a status period expiration, a user access of a content client application, and a client access of a content item by the content client application as an update trigger (Block 1210). The user device may initiate transmission of a status update upon identification of the update trigger describing an event causing transmission of the status update (Block 1212). The user device may update a content list describing digital content items via the status update (Block 1214). The user device may send the status update indicating the user device is still in use by the user to the online service to reset a pruning period to prevent a deactivation of the user device on the digital rights management list (Block 1216). The user device may reset the status period describing a wait time between status updates upon sending the status update (Block 1218).

Figure 13:
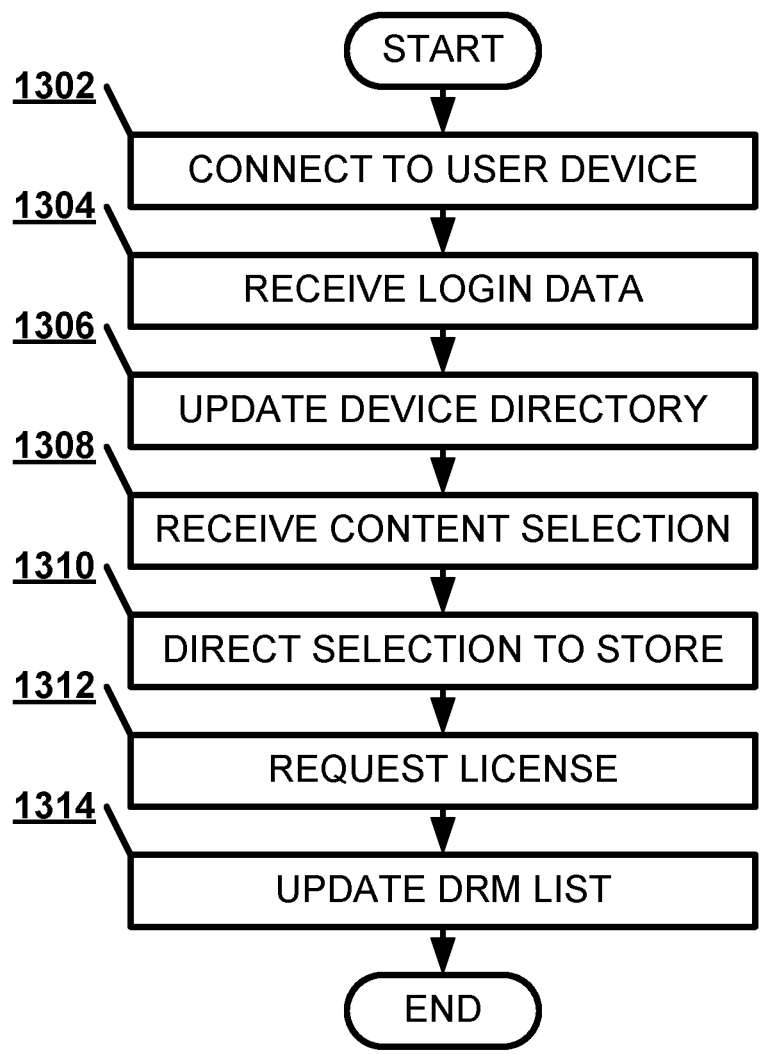
FIG. 13 illustrates, in a flowchart, one example of a method of providing digital content with an online service.

FIG. 13 illustrates, in a flowchart, one example of a method 1300 of providing digital content with an online service. The online service may connect to a user device via data network (Block 1302). The online service may receive login data for a primary online account (Block 1304). The online service may update a device directory server with a device identifier associated with the user device (Block 1306). The online service may receive a digital content item selection from the user device (Block 1308). The online service may direct the digital content item selection to a digital content store (Block 1310). The online service may request a content license for the digital content item from a licensing service (Block 1312). The online service may update the primary digital rights management list at the device directory server (Block 1314).

Figure 14:
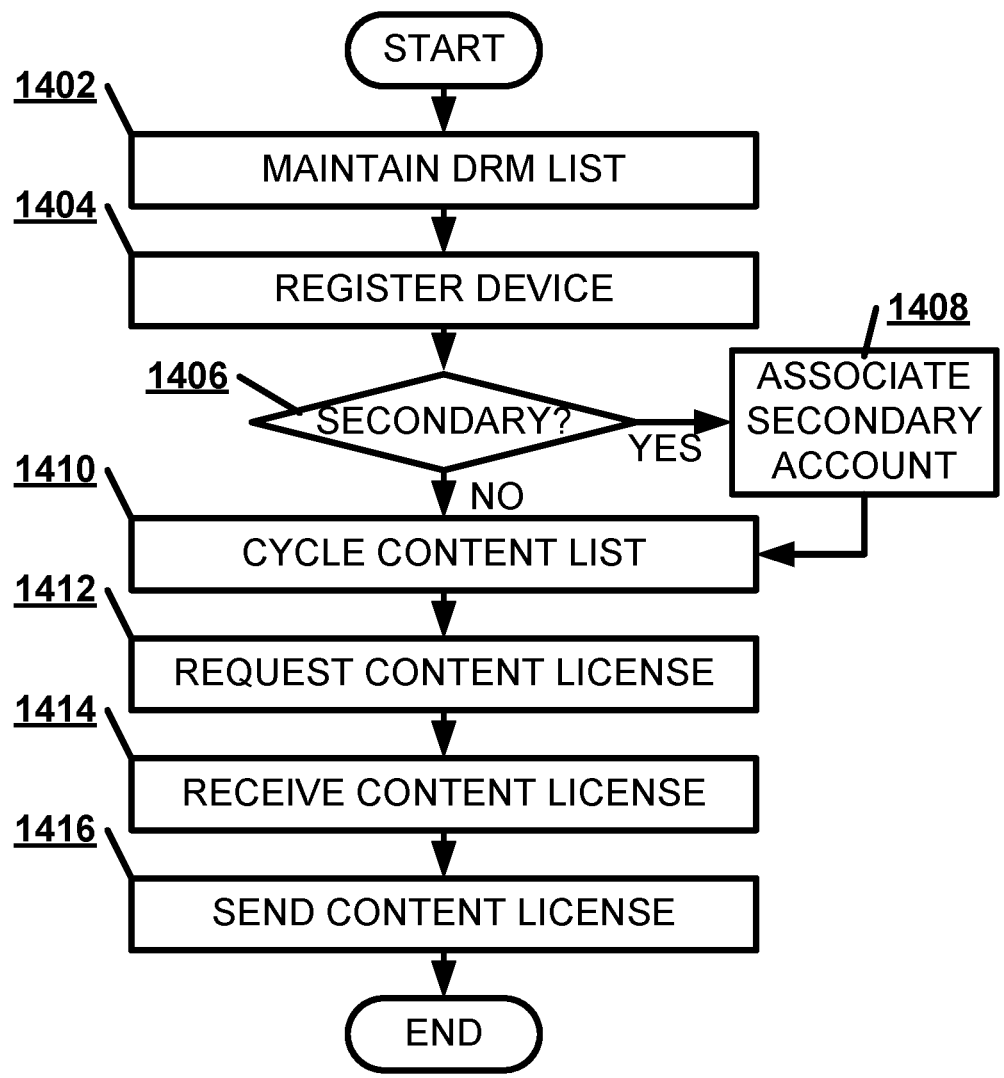
FIG. 14 illustrates, in a flowchart, one example of a method of registering digital content with a device directory server.

FIG. 14 illustrates, in a flowchart, one example of a method 1400 of registering digital content with a device directory server. The device directory server may maintain a primary digital rights management list for a primary online account describing a user device (Block 1402). The device directory server may register the user device with the primary digital rights management list of the primary online account (Block 1404). If the user device is associated with a second online account (Block 1406), the device directory server may associate the user device with the secondary online account (Block 1408). The device directory server may cycle through a content list for the primary online account to request a content license for the user device for each digital content item on the content list (Block 1410). The device directory server may request a content license for each digital content item on the content list from a licensing service (Block 1412). The device directory server may receive a content license for each digital content item on the content list from a licensing service (Block 1414). The device directory server may send a content license for each digital content item on the content list to the user device (Block 1416).

Figure 15:
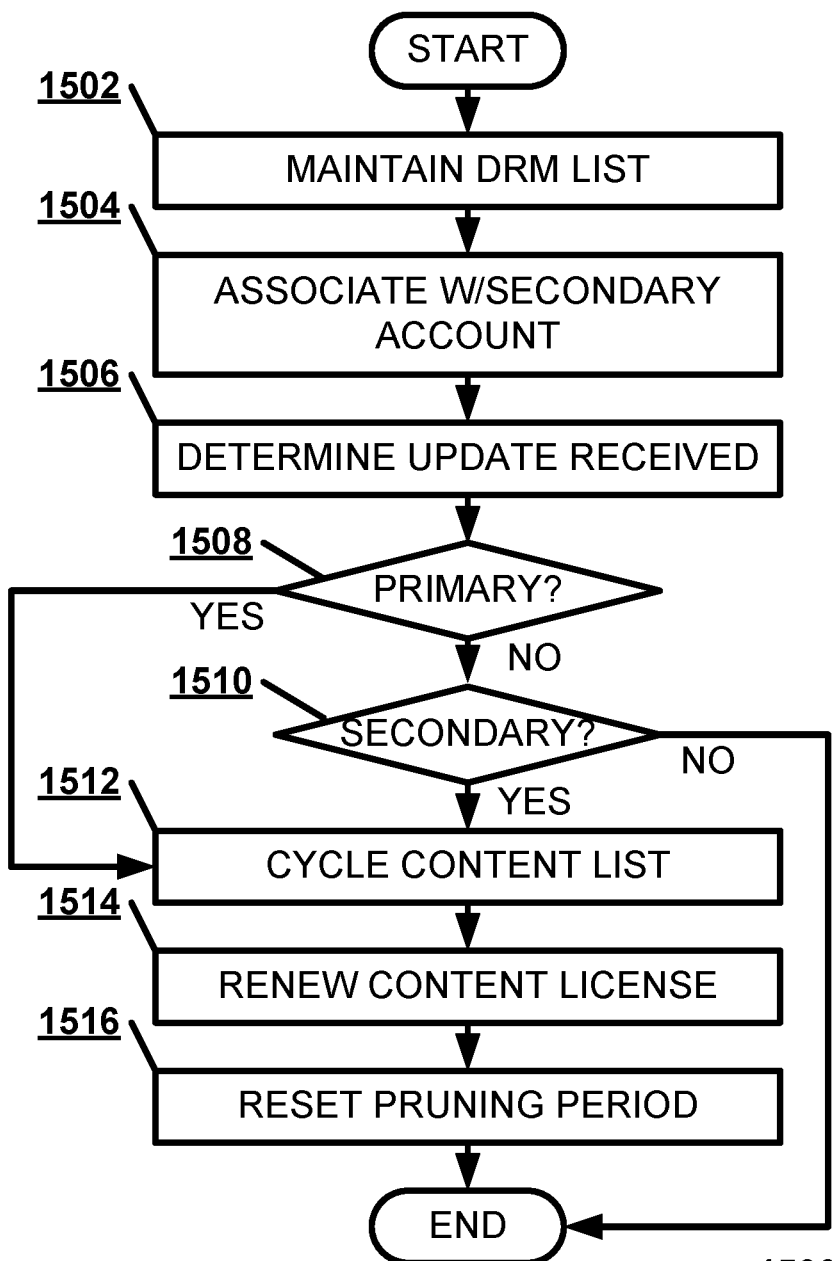
FIG. 15 illustrates, in a flowchart, one example of a method of receiving a status update at a device directory server.

FIG. 15 illustrates, in a flowchart, one example of a method 1500 of receiving a status update at a device directory server. The device directory server may maintain a primary digital rights management list for a primary online account describing a user device (Block 1502). The device directory server may associate the user device with a secondary online account (Block 1504). The device directory server may determine whether a status update has been received from the user device (Block 1506). If the device directory server receives status update via the primary online account for the user device resetting the pruning period for the user device (Block 1508), or if the device directory server receives the status update via the secondary online account for the user device resetting the pruning period for the user device (Block 1510), the device directory server may cycle through a content list describing a digital content set for the user device upon receiving the status update to renew each content license for each digital content item on the content list (Block 1512). The device directory server may renew a content license for each digital content item on the user device for a licensing period for each digital content item upon receiving the status update (Block 1514). The device directory server may reset the pruning period upon receiving the status update (Block 1516).

Figure 16:
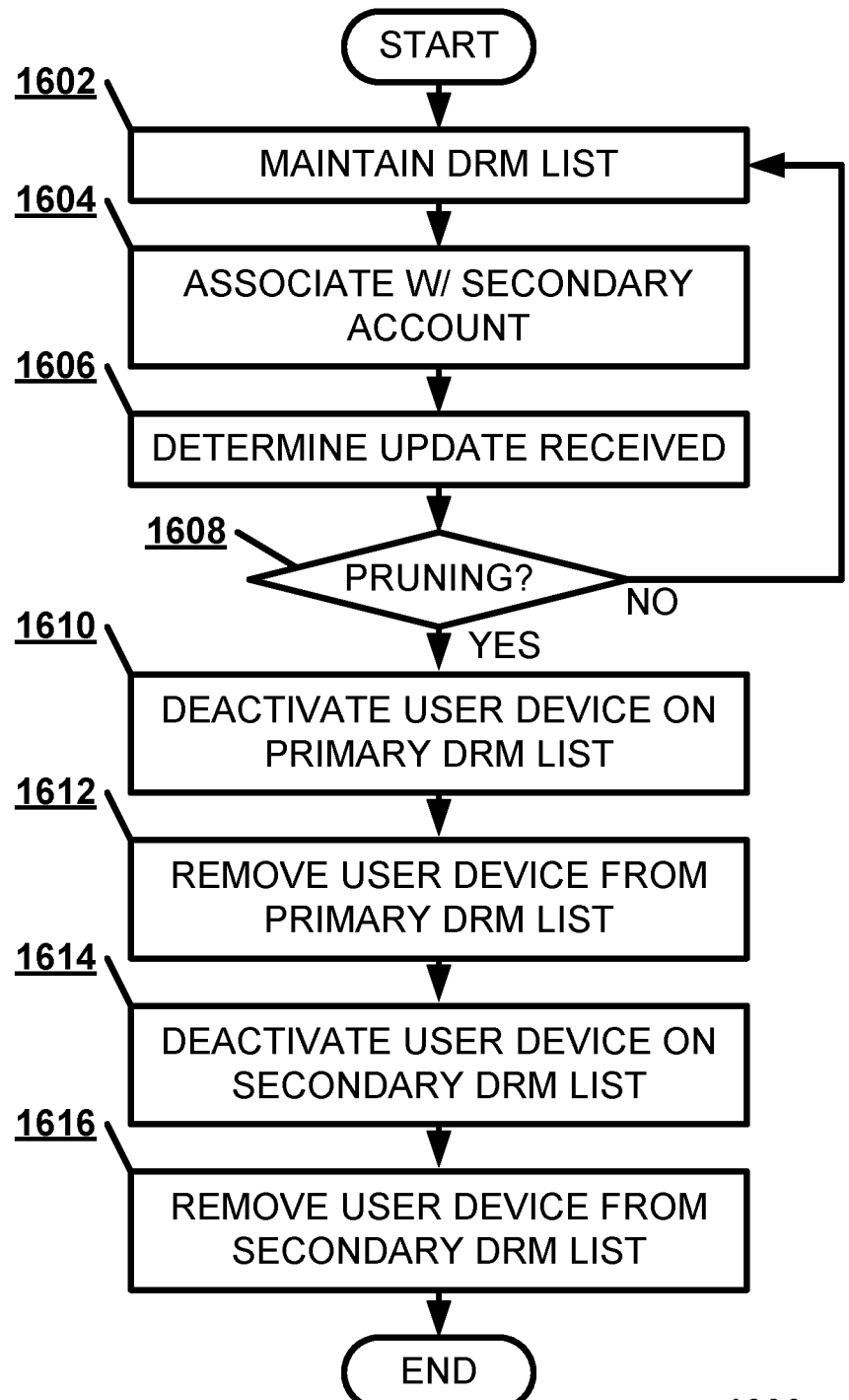
FIG. 16 illustrates, in a flowchart, one example of a method of pruning a digital rights management list at a device directory server.

FIG. 16 illustrates, in a flowchart, one example of a method 1600 of pruning a digital rights management list at a device directory server. The device directory server may maintain a primary digital rights management list associating a user device with a primary online account for a user having a content license for digital content item (Block 1602). The device directory server may associate the user device with a secondary online account (Block 1604). The device directory server may determine whether a status update indicating the user device is still in use by the user has been received from the user device (Block 1606). If the device directory server has not received a status update from the user device within a pruning period (Block 1608), the device directory server may deactivate the user device on the primary digital rights management list for the primary online account when no status update has been received within a pruning period for the user device to be associated with the primary online account (Block 1610). The device directory server may remove the user device from the primary digital rights management list upon deactivating (Block 1612). The device directory server may deactivate the user device on the secondary digital rights management list for a secondary online account when no status update has been received within the pruning period (Block 1614). Alternately, the user device may remain active on the secondary digital rights management list if the secondary digital rights management list has a different pruning period. The device directory server may remove the user device from the secondary digital rights management list upon deactivating (Block 1616).

Figure 17:
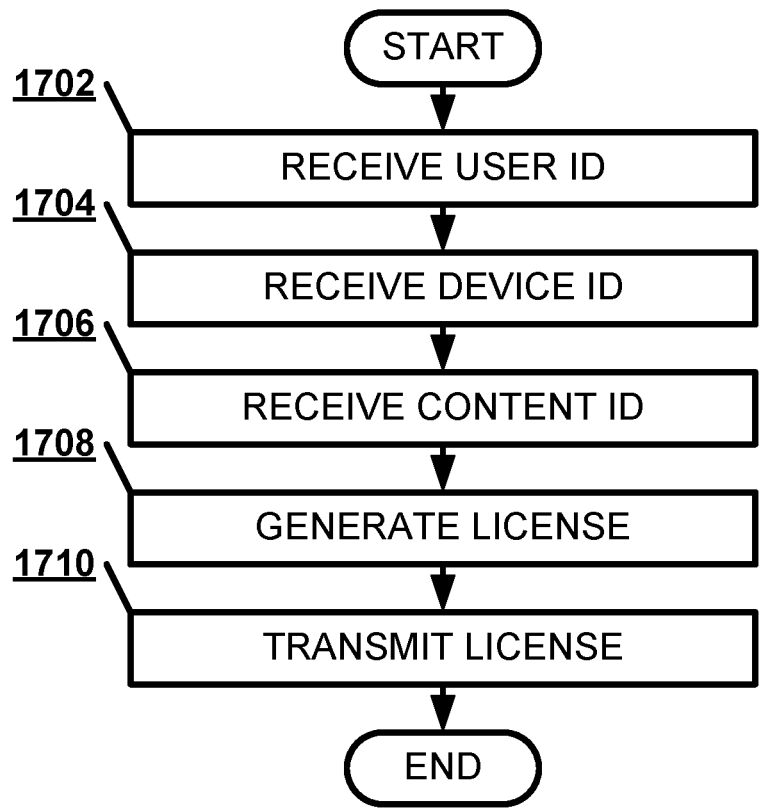
FIG. 17 illustrates, in a flowchart, one example of a method of providing a content license with a licensing service.

FIG. 17 illustrates, in a flowchart, one example of a method 1700 of providing a content license with a licensing service. The licensing service may receive a user identifier from the online service (Block 1702). The licensing service may receive a device identifier for the user device from the online service (Block 1704). The licensing service may receive a content identifier for the digital content item from the online service (Block 1706). The licensing service may generate a content license for the digital content item to be executed or presented on a user device for a licensing period (Block 1708). The licensing service may transmit the content license for the digital content item to the online service to be forwarded to the user device (Block 1710).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A device directory server, comprising:
   a processor; and
   a computer-readable hardware storage medium having computer-executable instructions stored thereupon which, when executed by the processor, cause the device directory server to:
      receive an authorization request, from a first user account associated with a computing device, to use a content item on the computing device, wherein the content item is licensed for use by a second user account associated with the computing device and the authorization request is transmitted by the first user account associated with the computing device in response to accessing a content application installed on the computing device and using the content item within the content application;
      respond to the authorization request with a determination that the first user account is authorized to use the content item on the computing device, wherein the determination is based on a digital rights management list associated with the second user account, wherein each entry in the digital rights management list includes corresponding content items licensed to the second user account;
      receive, from the first user account associated with the computing device, a status update; and
      in response to receiving the status update from the first user account associated with the computing device:
         identify other content items licensed for use by the second user account on the digital rights management list; and
         renew, for the second user account, licenses for the content item and the other content items.

2. The device directory server of claim 1, wherein the determination that the first user account is authorized to use the content item on the computing device is further based on the computing device being a shared computing device for the first user account and the second user account.

3. The device directory server of claim 2, wherein the first user account is not authorized to use the content item or the other content items on other computing devices that are not shared with the second user account.

4. The device directory server of claim 1, wherein a second user is required to be signed into the second user account for the first user account to be authorized to use the content item on the computing device.

5. A method, comprising:
   receiving an authorization request, from a first user account associated with a computing device, to use a content item on the computing device, wherein the content item is license for use by a second user account associated with the computing device and the authorization request is transmitted by the first user account associated with the computing device in response to accessing a content application installed on the computing device and using the content item within the content application;
   responding to the authorization request with a determination that the first user account is authorized to use the content item on the computing device, wherein the determination is based on a digital rights management list associated with the second user account, wherein each entry in the digital rights management list includes corresponding content items licensed to the second user account;
   receiving, from the first user account associated with the computing device, a status update; and
   in response to receiving the status update from the first user account associated with the computing device:
      identifying, by one or more processors, other content items licensed for use by the second user account on the digital rights management list; and
      renewing, for the second user account, licenses for the content item and the other content items.

6. The method of claim 5, wherein the determination that the first user account is authorized to use the content item on the computing device is further based on the computing device being a shared computing device for the first user account and the second user account.

7. The method of claim 6, wherein the first user account is not authorized to use the content item or the other content items on other computing devices that are not shared with the second user account.

8. The method of claim 5, wherein a second user is required to be signed into the second user account for the first user account to be authorized to use the content item on the computing device.

9. One or more computer-readable hardware storage media having computer-executable instructions stored thereupon which, when executed by one or more processors, cause a system to perform operations comprising:
   receiving an authentication request, from a first user account associated with a computing device, to use a content item on the computing device, wherein the content item is licensed for use by a second user account associated with the computing device and the authorization request is transmitted by the first user account associated with the computing device in response to accessing a content application installed on the computing device and using the content item within the content application;
   responding to the authorization request with a determination that the first user account is authorized to use the content item on the computing device, wherein the determination is based on a digital rights management list associated with the second user account, wherein each entry in the digital rights management list includes corresponding content items licensed to the second user account;
   receiving, from the first user account associated with the computing device, a status update; and
   in response to receiving the status update from the first user account associated with the computing device:
      identifying other content items licensed for use by the second user account on the digital rights management list; and
      renewing, for the second user account, licenses for the content item and the other content items.

10. The one or more computer-readable hardware storage media of claim 9, wherein the determination that the first user account is authorized to use the content item on the computing device is further based on the computing device being a shared computing device for the first user account and the second user account.

11. The one or more computer-readable hardware storage media of claim 10, wherein the first user account is not authorized to use the content item or the other content items on other computing devices that are not shared with the second user account.

12. The one or more computer-readable hardware storage media of claim 9, wherein a second user is required to be signed into the second user account for the first user account to be authorized to use the content item on the computing device.

* * * * *